April 28, 1959 P. KOROL ET AL 2,884,283
SHAFT SUPPORT
Filed May 31, 1956
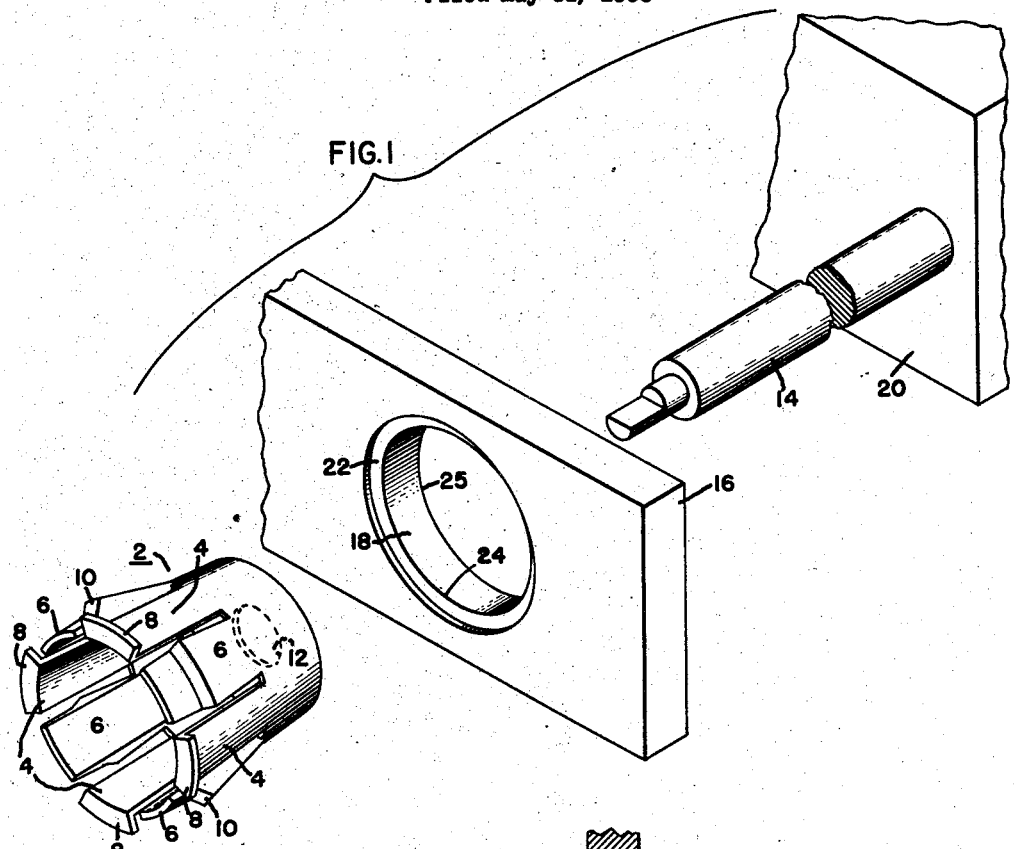
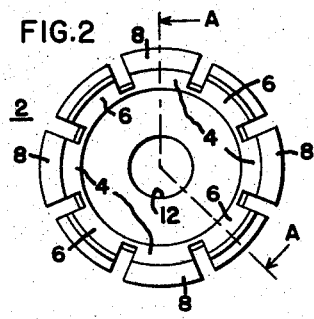
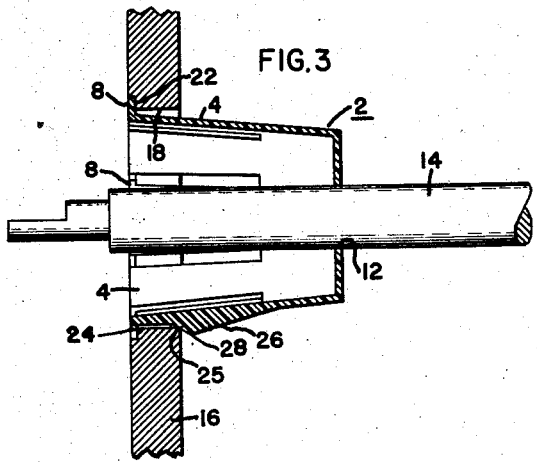
INVENTORS:
PETER KOROL,
HARRY G. WOEHRLE JR.,
BY Donald N. Timbre
THEIR ATTORNEY.

2,884,283

SHAFT SUPPORT

Peter Korol, East Syracuse, and Harry G. Woehrle, Jr., North Syracuse, N.Y., assignors to General Electric Company, a corporation of New York Application May 31, 1956, Serial No. 588,387

2 Claims. (Cl. 308—15)

This invention relates to improved means to provide a bearing support for a shaft.

For example in television receivers, the rotatable shafts for the various controls extend through openings in the cabinet, and in some instances the shaft is so long as to require some support near the opening in the cabinet. In previous constructions, this support has been provided by a washer or other member mounted on the cabinet and having a hole of a diameter slightly larger than that of the shaft. This permits the shaft to turn freely and yet prevents the shaft from being bent in any direction. However, as is well known by those familiar with the manufacture of television receivers or similar equipment, the angular orientation of the control shafts with respect to the chassis is not precise and if the shafts are long, it is obvious that they are apt to bend under their own weight. Hence, if the openings in the cabinet are just slightly larger than the shafts, it takes considerable time to insert the shafts in the openings. If the shafts are not properly inserted, and the chassis is pushed toward the front end of the cabinet in an attempt to place them in the final position, the shafts, as well as the controls to which they are attached, may be damaged.

Accordingly, it is an object of this invention to provide a support for control shafts of television receivers and the like which do not require precision manufacture and which at the same time enable quick assembly without damaging the equipment involved.

This object may be achieved in accordance with the principles of this invention by provision of a shaft support that may be snapped into position after the control shafts have been mounted in their final position. With such a support, it is possible for the openings in the wall of the cabinet to be much larger than the diameter of the shaft so as to permit the electronic chassis from which the control shafts project to be quickly placed in position.

For a better and complete understanding of the invention, reference is now made to the drawings in which:

Figure 1 is an exploded view of the shaft support, a section of the wall of a cabinet in which it is to be inserted and the chassis with its projecting control shaft;

Figure 2 is a view of a portion of one end of the shaft support, and

Figure 3 is a cross sectional view of the shaft support along the section AA of Figure 2.

As shown in Figure 1, a shaft support, generally indicated by the numeral 2, has, in this particular embodiment of the invention, the general shape of a cup in the shape of a truncated cone. The sides of the cup-like support 2 are formed at least in part by parallel fingers 4 of one type interspersed with fingers 6 of a different type. Each of the fingers 4 are provided with outwardly extending or radial flanges 8, and each of the fingers 6 are provided with a sloping surface of shoulder 10 on the outside that slope toward the open end of the cup formed by the fingers and also toward the central axis of the cup. The smaller end of the support or base portion of the cup is provided with an opening 12 that is large enough to encompass a control shaft such as indicated by the numeral 14. The shape of the opening 12 is such as to provide a bearing surface for the control shaft 14. The shaft support 2 may be made from separate pieces, may be moulded from plastic or may be stamped from sheet metal. In the illustrated embodiment the fingers 6 are shown as having varying thickness as might be the case if the support is made from plastic. If it is made from metal, it is apparent that the fingers would have the same thickness, but would be bent so that the outer contours are the same. In any case, the fingers 4, 6 should be elastic or resilient for reasons which will subsequently be clear.

A section 16 of a cabinet wall is provided with an aperture 18 that is considerably larger than the shaft 14. Hence, in mounting a chassis 20 and its projecting shaft 14, it is relatively easy to insert the shaft 14 in the aperture 18 and to adjust its position until the shaft 14 is in the approximate center of the aperture 18. If the aperture 18 is only slightly larger than the shaft 14, it would be necessary to precisely align the shaft with the exact center of the aperture 18 before pushing the chassis 20 into its final position. In order that the shaft support 2 not extend beyond the front wall of the side 16 of the cabinet, the periphery of the aperture 18 on the front surface of the side of the cabinet is provided with a recess 22.

After the chassis 20 is adjusted to its final position, the opening 12 is placed over the end of the shaft 14 and moved toward the shaft until the shoulders 10 of the fingers 6 bear against the edge 24 and the radial flanges 8 of the fingers 4 are flush against the bottom of the recess 22.

When this is done, the relation of the various parts is as illustrated in Figure 3 which, as previously explained, is a view taken along the cross section AA of Figure 2. This is done so as to illustrate in one view the cross section of a finger 4 as well as the cross section of a finger 6. From an examination of Figure 3, it can be seen that if the distance between the approximate center of the shoulder 10 of a finger 6 and the nearer surface of a radial flange of a finger 4 is approximately equal to the thickness of the cabinet wall 16, that the support 2 may be snapped into the position shown. The shoulder 10 allows for variations in the thickness of the wall 16 in different cabinets. It can also be seen that the fingers 6 are preferably tapered between the base portion of the cup and the shoulder 10. The fingers 4 could be similarly tapered, but need not be. As the support 2 is thrust through the opening 18, an edge 25 engages fingers 4 at a point, such as 26, at which point the cross sectional diameter of the support is equal to the diameter of the aperture 18. As the support 2 is thrust farther into the aperture 18, all the fingers 6 are pressed inwardly. When the support 2 is thrust still farther into the aperture 18, the inner end 28 of the shoulder 10 becomes even with the edge 24 of the aperture 18. From this point on, the resilient fingers 6 expand so as to press the shoulders 10 against the edge 24. Finally, the radial flanges 8 seat in the recess 22.

It will be seen that the support 2 is prevented from further inward movement by the radial flanges 8, and from outward movement by the shoulder 10. Furthermore, if the shaft 14 is not in the exact center of the aperture 18, the support 2 can still accommodate the shaft 14 because the resilience of the fingers 4, 6 permits it to warp without causing the fingers 4, 6 to lose their grip on the cabinet wall 16. Whereas the support 2 and the aperture 18 have been illustrated and described as being circular in cross section, it is apparent that other cross sectional shapes may be used.

While we have illustrated a particular embodiment of our invention, it will of course be understood that we do not wish to be limited thereto, since various modifications, both in the circuit arrangement and in the instrumentalities, may be made and we contemplate by the appended claims to cover any such modifications as fall within the true spirit and scope of the invention.

What we claim as new and desire to secure by Letters Patent of the United States is:

1. A molded bearing support comprising: a base portion; means defining an opening in said base portion; a side connected to said base portion and formed at least in part by first and second groups of resilient fingers that extend in a direction away from said base portion so as to form a cup having outwardly flaring sides, each of said first group of fingers having outwardly extending radial flanges at the ends furthest from said base portion, and each of said second group of fingers having raised shoulders formed on their outer surface, said raised shoulders sloping from said outer surfaces toward the axis of said cup and the open end of said cup formed by the ends of said first and second groups of fingers.

2. The molded bearing support of claim 1 wherein all of the fingers in said first and second groups of resilient fingers are of equal length.

References Cited in the file of this patent
UNITED STATES PATENTS

| | | |
|---|---|---|
| 1,987,035 | Tideman | Jan. 8, 1935 |
| 2,610,012 | Mackey et al. | Sept. 9, 1952 |
| 2,667,200 | Bedford | Jan. 26, 1954 |
| 2,687,862 | Crowther | Aug. 31, 1954 |